United States Patent Office 3,334,689
Patented Aug. 8, 1967

3,334,689
METHOD OF STABILIZING OR SEALING
EARTH FORMATIONS
Homer C. McLaughlin, Duncan, Okla., assignor to Halliburton Company, Duncan, Okla., a corporation of Delaware
No Drawing. Filed July 9, 1965, Ser. No. 470,900
15 Claims. (Cl. 166—33)

This invention relates to the stabilization of soil and substrata and other earth formations, consolidating loose sands, grouting, and bridging or plugging openings of vugular and/or fractured formations, whereby they are rendered less permeable to the passage of fluids such as water.

The permeability characteristics of soil and geological formations are of considerable importance, particularly in the drilling and producing of wells. Serious problems have been encountered in passages or channels in the earth due to the leakage of water from subterranean springs or from the normal water table into oil wells through porous strata of the earth. In addition, during drilling large quantities of valuable oil well drilling muds are often lost when the mud under pressure passes from the well out into porous formations, such as gravelwash, limestone and sandstone and weak formations such as shale. This is commonly referred to as lost circulation. Accordingly, there is a real need for the treatment providing improved strength and lowered water permeability in earth formations.

Previously, various crosslinked polymeric gels of acrylamide and similar materials have been proposed for use in earth stabilization. Many polyfunctional materials are not suitable as crosslinkers for acrylamide and similar compounds in the formation of earth stabilizing gels. In some instances, this may be attributed to the fact that the reactivity of the crosslinking agent and acrylamide is mismatched or there is little affinity to copolymerize. This often results in the formation of two separate polymers, one very rich in crosslinker and the other very poor in crosslinker. The polymer rich in crosslinker tends to precipitate as a hard solid while the polymer poor in crosslinker provides only a viscous syrup. In some cases only a single polymer forms, again providing only a viscous syrup. In other cases, even though a gel is formed, it is characterized by low tensile strength and poor stability on aging. Accordingly, in order to provide a fully satisfactory gel, it is necessary that the crosslinker and the acrylamide contain vinyl groups, which are of the same order of magnitude in reactivity or which copolymerize readily. In this way, a three dimensional polymeric lattice capable of retaining water and forming a gel will be provided. In addition, the gel must possess good strength and aging characteristics over a wide range of conditions.

Thus, it is an object of this invention to provide a process using an improved crosslinked polymeric gel in the stabilization of earth formations, consolidating loose sands, grouting, and bridging or plugging openings of vugular or fractured formations.

Another object of this invention is to provide for the treatment of earth formations as more fully hereinafter defined to decrease permeability to inert liquids, particularly water.

Another object of this invention is to provide a composition particularly adapted to seal porous formations in oil wells against the passage of liquids.

Yet another object of this invention is to prevent lost circulation of drilling mud in oil wells.

Other objects and advantages of the invention will be apparent to those skilled in the art from the more detailed description which follows.

The present invention comprehends the stabilization and/or sealing of earth formations with certain compositions which are capable of conversion by polymerization of polymerizable substances to a state wherein the final components are not substantially self-dispersible in water, that is, do not form even after appropriate agitation, true or colloidal solutions, emulsions or suspensions in water to any significant extent.

More particularly, the present invention comprises a method of stabilizing and/or sealing earth formations by the injection of an aqueous solution of a polymerizable composition containing a monoethylenically unsaturated acrylate monomer, usually in an amount of from about 50 to 99% by weight of the composition, and a crosslinking agent as hereinafter defined. The crosslinking agent is normally employed in an amount of from about 20% to 1% by weight of the composition. The water used in the initial solution is generally sufficient to dissolve the monomer, and is usually present in an amount of from about 5 to 20 parts by weight per part of polymerizable materials. After the aqueous composition has been injected into the formation, it is permitted to react to form the desired crosslinked gel.

As used herein, "earth" refers to sand, clay, gravel, formation fines and other loose or incompetent formations. "Earth" also refers to consolidated or competent formations that contain conduits. The conduits may be capillaries such as found in sandstone, vugular passages such as found in limestone, or cracks and fractures such as found in fractured shales, granite, or schist. Thus, there is included surface soil, sub-soil and lower geological formations. The consolidation and/or sealing of formations three feet or more below the earth surface are particularly of interest in the present invention.

Suitable acrylate monomers include sodium acrylate, acrylic acid, methyl acrylate, acrylonitrile, acrylamide, and methacrylamide. Acrylamide is the monomer of principal interest.

The crosslinking agents above-referred to contain at least two carbon-to-carbon double bonds, and are selected from the following structures.

The compounds prepared by reacting phenol or other aromatic compounds with methylol acrylamide under acid conditions and having the formula:

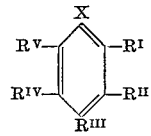

In the above formula, at least two of the "R" groups must be acrylamidomethyl

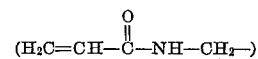

groups. Normally, $R^I$, $R^{III}$, or $R^V$ will be the "R" groups that are acrylamidomethyl. The remaining R's may be any of the following radicals: hydrogen, aryl, substituted aryl, amino, substituted amino, nitro, nitroso, carboxyl, or hydroxyl. The "X" group is hydroxyl or amino. Compounds of this type include $\alpha,\alpha',\alpha''$-tris (acrylamindo)-2,4-dihydroxymesitylene, 2,4,6-tris (acrylamidomethyl) phloroglucinol, 2,4,6-tris (acrylamidomethyl) phenol, 2,4,6-tris (acrylamidomethyl) 3,5-xylenol, 2,3,6-tris (acrylamidomethyl) hydroquinone, 2,6-bis (acrylamidomethyl) 4-nitrophenol, $\alpha,\alpha',\alpha''$-tris (acrylamido) mesitol, 2,3,6-(acrylamidomethyl) 1,4-phenylenediamine and 4,6-bis (acrylamidomethyl) - 2 - aminophenol, polyacrylamidomethylflavinoids condensate.

The second type of crosslinking agent is normally derived from reaction of methylol acrylamide with suitably activated organic compounds other than phenols, and phenyl amines. Examples of suitably activated organic compounds are pyridines, polyalkylbenzenes, nitroalkyls, and especially polyfunctional amides. The second type of crosslinking agent has the formula (2) $$(H_2C=CH-\overset{O}{\overset{\|}{C}}-NH-CH_2-)_x(R^{VI})_n$$

where $R^{VI}$ is a polyvalent radical having a valence equal to $x$, $x$ is an integer of from 2 to about 5, and $n$ is 0 or 1, with the proviso that when $n=0$, $x=2$. $R^{VI}$ may be alkylene, arylene, hetrocyclic-arylene, or polyamido such as 3-nitrilotrispropionamido, ureylene and the like.

The Formula 2 compounds include sym-bis (acrylamidomethyl) oxamide, sym-bis (acrylamidomethyl) urea, tris (acrylamidomethyl) nitromethane, 2,4,6-tris (acrylamidomethyl) pyridine, and polyacrylamidomethyl-alkylpyridines condensate, N,N',N''-tris (acrylamidomethyl) nitrilotrispropionamide.

Another class of crosslinking agents are the polyethylenically unsaturated ethers and esters of the formula (3) $$Z-(-----R^{VII})_m$$

wherein Z may be $$-\overset{O}{\overset{\|}{\underset{|}{P}}}-, \quad -\overset{O}{\overset{\|}{C}}-$$

or a polyvalent linking organic group such as alkylene, O-interrupted alkylene, arylene, alkenylene, substituted alkylene and substituted arylene, $R^{VII}$ may be allyloxy, vinyloxy, acrylyloxy, methacrylyloxy, or carboallyloxy, and $m$ is an integer of from 2 to about 5 and is numerically equal to the valence of Z. These compounds include polyethylene glycol diacrylate, nitrilo tris-2-ethyl acrylate, glycerol diacrylate, tris (acryloxymethyl) nitro methane, sorbitol triacrylate, acrylic acid condensate with epoxidized linseed oil, phloroglucinol diacrylate, polyglycidyl acrylate, triallyl phosphate, diallyl carbonate, diallylmaleate, diallyl malonate, diallyl itaconate, diallyl formal, allyl ethers of polyvinyl alcohol, 1,1,3,3 tetraallyloxy propane, diallyl ethylenedioxy ether, diallyl polyethyleneglycol ether, allyl ethers of branched ethylene oxide condensates, ethylene dimethacrylate, 1,4-butanediol diallyl ether, glyceryl triallyl ether, condensate of allyl glycidyl ether and diethylenetriamine, condensate of allyl glycidyl ether and ammonia, glycol diacrylate, diallyl carbonate, diallyl oxylate, diallyl malonate, triallyl citrate, acryl esters of polyvinyl alcohol, trimethylol propane diallyl ether, and mono-trimethylol-propanediallylether maleate.

Various catalysts, activators, buffers and the like may be used in preparing the gels for the process of this invention. Typical of such materials are disodium phosphate duohydrate, potassium ferricyanide, dimethylaminopropionitrile, ammonium persulfate and triethanolamine. The last-mentioned compound is particularly effective when used in a catalytic amount (about 0.5 to 10% by weight of monomers) to promote the formation of an acrylamide-triallyl phosphate gel which retains its strength over a prolonged period.

The following examples illustrate the invention. In the examples, the parts and the percentages are by weight unless otherwise indicated.

Various crosslinking agents were employed to prepare typical gels of the invention. The gels were first prepared in accordance with the following general polymerization recipe:

| Material | Amount | Remarks |
|---|---|---|
| Acrylamide | 9 grams | |
| Crosslinker | 1 ml | Added to the dry acrylamide to encourage maximum solubility or disperson when the very soluble acrylamide dissolves in water. |
| Dimethylamino-propionitrile | 0.4 ml | Accelerator and buffer. |
| Water | 90 ml | Stir until acrylamide is dissolved and the crosslinker is dispersed. |
| Ammonium persulfate | 0.5 gm | Catalyst. |

The 100 ml. test samples are observed for the type of gel formed.

| Example | Crosslinker | Crosslink Ability |
|---|---|---|
| 1 | Urelyene bis (N-methylene-acrylamide). | Tough flexible gel. |
| 2 | Nitrilo-tris (Propionamido-methylene) N,N',N'' triacrylamide. | Do. |
| 3 | Hexakis (acrylamidomethyl) melamine. | Do. |
| 4 | a, a', a'' tris (acrylamido) mesitol. | Very flexible gel. |
| 5 | a, a', a'' tris (acrylamido) 2,4-dihydroxymesitylene. | Tough flexible gel. |
| 6 | a, a', a'' tris (acrylamido) 2,4,6-trihydroxymesitylene. | Excellent tough flexible gel. |
| 7 | 2,4,6-tris (acrylamidomethyl) 3,5-xylenol. | Do. |
| 8 | 2,6-bis (acrylamidomethyl)-4 nitro phenol. | Tough flexible gel. |
| 9 | 4,6-bis (acrylamidomethyl)-2-aminophenol. | Flexible gel. |
| 10 | 2,4,6-tris (acrylamidomethyl) pyridine. | Tough flexible gel. |
| 11 | Acrylamidomethyl alkylpyridine. | Excellent flexible gel. |
| 12 | Acrylamidomethyl-flavinoids. | Very flexible gel. |
| 13 | Tris (acrylamidomethyl) nitro methane. | Do. |
| 14 | Triallyl phosphate. | Excellent gel. |
| 15 | Diallyl carbonate. | Do. |
| 16 | 1,4-butanediol diallyl ether. | Do. |
| 17 | Glycerol triacrylate. | Do. |

EXAMPLE 18

Two sand columns were prepared in a tubing having a length of about 46″ and a diameter of 32 mm. The packing of the columns was accomplished by filling the column about 35% full of water. Then, Oklahoma No. 1 sand was added by means of a funnel. The funnel was used to assure a constant flow of sand much in the manner of an hour glass. With a constant flow of sand, after initial stratification of the leading edge of settling sand, the subsequent settling sand is of constant composition of fine and coarse particles. Next, the sand column as it built up was constantly vibrated to assure close packing and eliminate "quick sand" structure. If the column is not vibrated, the sand tends to build up at the water-air interface by capillary adhesion forces and ultimately bridges across the tube. The pore volume of the sand pack was approximately 225 ml. The squeeze mixtures for the columns were Gel A and Gel B. Gel A contained 9 grams of acrylamide and 1 ml. of triallyl phosphate. The Gel B contained 9 grams of acrylamide and 1 gm. of methylene-bis-acrylamide. The gel formulations were as follows:

| Material: | | Amount |
|---|---|---|
| Gel A or Gel B | grams | 10 |
| Water | ml | 90 |
| Disodium phosphate duohydrate | grams | 2 |
| 10% potassium ferricyanide solution | ml | 0.1 |
| Dimethylaminopropionitrile | ml | 0.116 |
| HS-C | gram | 1 |
| Ammonium persulfate | do | 0.5 |
| Total, approximately 100 ml. | | |

Table 1

The squeeze conditions were as follows: Squeeze volume—300 ml. Time to squeeze one pore volume—9 minutes. Squeeze pressure—10 p.s.i. The compressive strength was determined at various levels in each column, using core samples taken from the levels indicated:

| Core No. | Length Down the Column, Inches | Compressive Strength, p.s.i. | |
|---|---|---|---|
| | | Gel B | Gel A |
| 1 | 0–2¼ | 88 | 113 |
| 2 | 2¼–4½ | 89 | 104 |
| 3 | 4½–6¾ | 94 | 106 |
| 4 | 6¾–9 | 100 | 104 |
| 5 | 9¼–11½ | 115 | 112 |
| 6 | 11½–13¾ | 121 | 120 |
| 7 | 13¾–16 | 108 | [1] 104 |
| 8 | 16–18¼ | 120 | 124 |
| 9 | 18¼–20½ | 121 | 120 |
| 10 | 20½–22¾ | 118 | 124 |
| 11 | 22¾–25 | 104 | 123 |
| 12 | 25–27¼ | 112 | 123 |
| 13 | 27¼–29½ | 110 | 124 |
| 14 | 29½–31¾ | 117 | 116 |
| 15 | 31¾–34 | 118 | 122 |
| 16 | 34–36¼ | 108 | 118 |
| 17 | 36¼–38½ | 106 | 124 |
| 18 | 38½–40¾ | 106 | 121 |
| 19 | 40¾–43 | 109 | [2] 140 |
| 20 | 43–45¼ | 109 | 125 |

[1] Off center.
[2] Shock loaded.

The foregoing data indicate that the Gel A of this invention provides a generally increased compressive strength in the consolidated sand when compared to the Gel B which is typical of the prior art.

EXAMPLE 19

Consolidated sand samples were prepared in accordance with the procedure described in Example 18 using Oklahoma No. 1 sand, a column length of 36 inches and a column diameter of 3.75 cm. The squeeze conditions were as follows: Squeeze volume—400 ml., squeeze pressure—10 p.s.i. After gelling, the samples were aged a total of eight weeks, with the compressive strength being measured at the indicated intervals.

| | Formulation C | Formulation D |
|---|---|---|
| Acrylamide, percent | 9 | 9 |
| Triallyl phosphate, percent | 1 | 1 |
| Triethanolamine, percent | 0.5 | |
| Disodium phosphate duohydrate, percent | | 2 |
| Dimethylaminopropionitrile, percent | | 0.1 |
| Potassium ferricyanide, percent | 0.02 | 0.02 |
| Ammonium persulfate | 0.5 | 0.5 |
| Compressive strength, p.s.i. (3 core average): | | |
| One day | 112.6 | 110.6 |
| Three days | 103.2 | 97.2 |
| One week | 102.0 | 94.7 |
| Two weeks | 115.7 | 97.1 |
| Five weeks | 105.5 | 87.4 |
| Eight weeks | 104.0 | 85.6 |

In Formulation C, the gel was prepared using the preferred triethanolamine catalyst of my invention. Formulation D contained a catalyst system without triethanolamine. The foregoing data indicate the substantial improvement in strength obtained using triethanolamine catalyst.

Having fully described the invention, it is intended that it be limited only by the lawful scope of the appended claims.

I claim:

1. The method of stabilizing or sealing earth formations which comprises contacting the formation with an aqueous solution of a polymerizable composition comprising an acrylate monomer and a crosslinking agent selected from the group consisting of

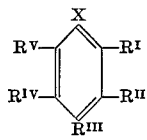

wherein at least two of the R substituents are acrylamidomethyl, and the remaining R groups are selected from the group consisting of hydrogen, aryl, amino, substituted aryl, substituted amino, nitro, nitroso, carboxyl and hydroxyl, and X is selected from the group consisting of hydroxyl and amino;

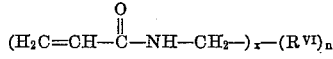

where $R^{VI}$ is a polyvalent radical having a valence equal to $x$, $x$ is an integer of from 2 to about 5, and $n$ is 0 or 1; and

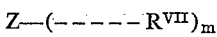

wherein Z is

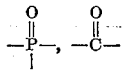

and polyvalent linking organic groups, $R^{VII}$ is selected from the group consisting of allyloxy, vinyloxy, acryloxy, methacryloxy and carboallyloxy, and $m$ is an integer of from 2 to about 5 and is numerically equal to the valence of Z, and permitting a polymeric gel to form.

2. The method of stabilizing or sealing earth formations which comprises contacting the formation with an aqueous solution of a polymerizable composition comprising from about 50% to about 90% by weight of an acrylate monomer, and from about 1% to about 20% by weight of a crosslinking agent selected from the group consisting of

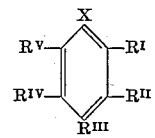

wherein at least two of the R substituents are acrylamidomethyl, and the remaining R groups are selected from the group consisting of hydrogen, aryl, amino, substituted aryl, substituted amino, nitro, nitroso, carboxyl and hydroxyl, and X is selected from the group consisting of hydroxyl and amino;

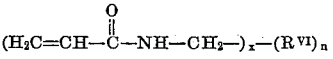

where $R^{VI}$ is a polyvalent radical having a valence equal to $x$, $x$ is an integer of from 2 to about 5, and $n$ is 0 or 1, and

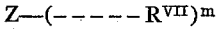

wherein Z is

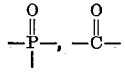

and polyvalent linking organic groups, $R^{VII}$ is selected from the group consisting of allyloxy, vinyloxy, acrylyloxy, methacryloxy and carboallyloxy, and $m$ is an integer of from 2 to about 5 and is numerically equal to the valence of Z, and permitting a polymeric gel to form.

3. The method of stabilizing or sealing earth which comprises contacting the formation with an aqueous solution of a polymerizable composition comprising from about 50% to about 90% by weight of an acrylamide, and from about 1% to about 20% by weight of a crosslinking agent selected from the group consisting of

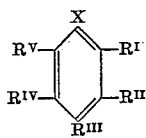

wherein at least two of the R substituents are acrylamidomethyl, and the remaining R groups are selected from the group consisting of hydrogen, aryl, amino, substituted aryl, substituted amino, nitro, nitroso, carboxyl and hydroxyl, and X is selected from the group consisting of hydroxyl and amino;

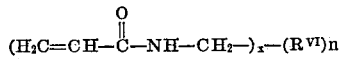

where $R^{VI}$ is a polyvalent radical having a valence equal to $x$, $x$ is an integer of from 2 to about 5, and $n$ is 0 or 1; and

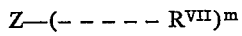

wherein Z is

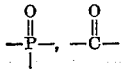

and polyvalent linking organic groups, $R^{VII}$ is selected from the group consisting of allyloxy, vinyloxy, acrylyloxy, methacryloxy and carboallyloxy, and $m$ is an integer of from 2 to about 5 and is numerically equal to the valence of Z, and permitting a polymeric gel to form.

4. The method of stabilizing or sealing earth formations which comprises contacting a subterranean earth formation with an aqueous solution of a polymerizable composition comprising from about 50% to about 90% by weight of an acrylamide, and from about 1% to about 20% by weight of a crosslinking agent selected from the group consisting of

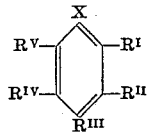

wherein at least two of the R substituents are acrylamidomethyl, and the remaining R groups are selected from the group consisting of hydrogen, aryl, amino, substituted aryl, substituted amino, nitro, nitroso, carboxyl and hydroxyl, and X is selected from the group consisting of hydroxyl and amino;

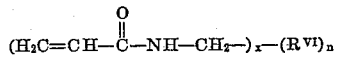

where $R^{VI}$ is a polyvalent radical having a valence equal to $x$, $x$ is an integer of from 2 to about 5, and $n$ is 0 or 1; and

wherein Z is

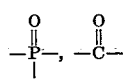

and polyvalent linking organic groups, $R^{VII}$ is selected from the group consisting of allyloxy, vinyloxy, acrylyloxy, methacryloxy and carboallyloxy, and $m$ is an integer of from 2 to about 5 and is numerically equal to the valence of Z, and permitting a polymeric gel to form.

5. The method of stabilizing or sealing earth formations which comprises contacting a subterranean earth formation with an aqueous solution of a polymerizable composition comprising from about 50% to about 90% by weight of an acrylamide, and from about 1% to about 20% by weight of a crosslinking agent having the formula

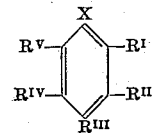

wherein at least two of the R substituents are acrylamidomethyl, and the remaining R groups are selected from the group consisting of hydrogen, aryl, amino, substituted aryl, substituted amino, nitro, nitroso, carboxyl and hydroxyl, and X is selected from the group consisting of hydroxyl and amino.

6. The method of claim 5 wherein X is hydroxyl.

7. The method of stabilizing or sealing earth formations which comprises contacting a subterranean earth formation with an aqueous solution of a polymerizable composition comprising from about 50% to about 90% by weight of an acrylamide, and from about 1% to about 20% by weight of a crosslinking agent having the formula

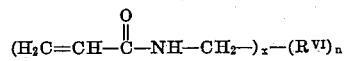

where $R^{VI}$ is a polyvalent radical having a valence equal to $x$, $x$ is an integer of from 2 to about 5, and $n$ is 0 or 1, and permitting a polymeric gel to form.

8. The method of claim 7 wherein R is aryl.

9. The method of stabilizing or sealing earth formations which comprises contacting a subterranean earth formation with an aqueous solution of a polymerizable composition comprising from about 50% to about 90% by weight of an acrylamide, and from about 1% to about 20% by weight of a crosslinking agent having the formula

wherein Z is

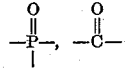

and polyvalent organic linking groups, $R^{VII}$ is selected from the group consisting of allyloxy, vinyloxy, acrylyloxy, methacrylyloxy and carboallylloxy, and $m$ is an integer of from 2 to about 5 and is numerically equal to the valence of Z, and permitting a polymeric gel to form.

10. The method of claim 9 wherein Z is

R is allyloxy, and $m$ equals 3.

11. The method of stabilizing or sealing earth formations which comprises contacting a subterranean earth formation with an aqueous solution of a polymerizable composition comprising from about 50% to about 90% by weight of an acrylamide, and from about 1% to about 20% by weight of triallyl phosphate.

12. The method of claim 11 wherein there is additionally present an effective catalytic amount of triethanolamine.

13. The method of stabilizing or sealing an incompetent earth formation in the vicinity of the borehole of an oil well which comprises injecting into the formation an aqueous solution of a polymerizable composition comprising an acrylate monomer and a cross-linking agent selected from the group consisting of

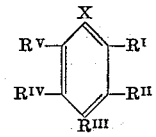

wherein at least two of the R substituents are acrylamidomethyl, and the remaining R groups are selected from the group consisting of hydrogen, aryl, amino, substituted aryl, substituted amino, nitro, nitroso, carboxyl and hydroxyl, and X is selected from the group consisting of hydroxyl and amino;

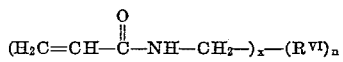

where $R^{VI}$ is a polyvalent radical having a valence equal to $x$, $x$ is an integer of from 2 to about 5, and $n$ is 0 or 1; and

wherein Z is

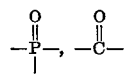

and polyvalent linking organic groups, $R^{VII}$ is selected from the group consisting of allyloxy, vinyloxy, acrylyloxy, methacrylyloxy and carboallyloxy, and $m$ is an integer of from 2 to about 5 and is numerically equal to the valence of Z, and permitting a polymeric gel to form.

14. The mthod of claim 13 wherein the acrylate monomer is acrylamide.

15. The method of claim 13 wherein the crosslinking agent is triallyl phosphate.

References Cited
UNITED STATES PATENTS

| | | | |
|---|---|---|---|
| 2,670,048 | 2/1954 | Menaul | 166—33 |
| 2,801,984 | 8/1957 | Morgan et al. | 166—33 X |
| 3,056,757 | 10/1962 | Rakowitz | 166—33 X |
| 3,121,463 | 2/1964 | Perry | 166—33 |
| 3,152,641 | 10/1964 | Boyd | 166—33 |
| 3,302,717 | 2/1967 | West et al. | 166—33 |

CHARLES E. O'CONNELL, *Primary Examiner.*

STEPHEN J. NOVOSAD, *Examiner.*